United States Patent
Wallner et al.

(10) Patent No.: US 8,002,666 B2
(45) Date of Patent: Aug. 23, 2011

(54) METHOD FOR CONTROLLING A MOTOR VEHICLE DRIVE TRAIN

(75) Inventors: Stefan Wallner, Friedrichshafen (DE); Notker Amann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 596 days.

(21) Appl. No.: 12/096,241

(22) PCT Filed: Jan. 16, 2007

(86) PCT No.: PCT/EP2007/000314
§ 371 (c)(1),
(2), (4) Date: Jun. 5, 2008

(87) PCT Pub. No.: WO2007/085363
PCT Pub. Date: Aug. 2, 2007

(65) Prior Publication Data
US 2008/0277229 A1 Nov. 13, 2008

(30) Foreign Application Priority Data
Jan. 26, 2006 (DE) .......................... 10 2006 003 713

(51) Int. Cl.
*B60W 10/02* (2006.01)
*B60W 10/08* (2006.01)
*B60W 10/04* (2006.01)
*B60W 20/00* (2006.01)
*H02P 15/00* (2006.01)

(52) U.S. Cl. ................. 477/8; 477/5; 477/6; 180/65.21; 180/65.285

(58) Field of Classification Search .................. 477/5, 6, 477/8; 180/65.21, 65.285; 903/912, 946
See application file for complete search history.

(56) References Cited

U.S. PATENT DOCUMENTS

| 5,713,814 | A   |   | 2/1998  | Hara et al.        |        |
|-----------|-----|---|---------|--------------------|--------|
| 6,149,544 | A   | * | 11/2000 | Masberg et al. ....... | 477/13 |
| 6,524,223 | B2  |   | 2/2003  | Graf et al.        |        |
| 6,805,648 | B1  |   | 10/2004 | Ehrlinger          |        |
| 6,817,327 | B2  |   | 11/2004 | Ehrlinger et al.   |        |

(Continued)

FOREIGN PATENT DOCUMENTS

| DE | 196 31 123 A1 | 2/1997  |
| DE | 197 26 567 A1 | 12/1998 |
| DE | 199 34 696 A1 | 5/2001  |
| DE | 100 25 586 A1 | 12/2001 |

(Continued)

OTHER PUBLICATIONS

Official Office Action for corresponding Japanese Application dated Apr. 25, 2011.

Primary Examiner — Tisha Lewis
(74) Attorney, Agent, or Firm — Davis & Bujold, P.L.L.C.

(57) ABSTRACT

A method for controlling a motor vehicle drive train including a combustion engine, an electric machine and a transmission, which are coupled by a summation gear system, having two input and one output elements, and a clutch. One input element is coupled to the crankshaft of the combustion engine, the other input element is coupled to the rotor of the electric machine and the output element is coupled to the input shaft of the transmission and the clutch is arranged between two elements of the summation gear system, such that when the clutch is disengaged a speed difference between the combustion engine and the transmission input shaft is synchronized by the electric machine and, if necessary, by a controlled engagement of the clutch. To improve synchronization, at the beginning of the synchronization the clutch is brought to its contact point before the engagement of the bridging clutch.

6 Claims, 2 Drawing Sheets

U.S. PATENT DOCUMENTS

| | | | |
|---|---|---|---|
| 6,966,860 B2 | 11/2005 | Heitmann et al. | |
| 6,974,402 B2 * | 12/2005 | Colvin et al. | 477/5 |
| 7,654,931 B2 * | 2/2010 | Popp et al. | 477/4 |
| 7,758,467 B2 * | 7/2010 | Ashizawa et al. | 477/5 |
| 7,766,107 B2 * | 8/2010 | Joe et al. | 180/65.21 |
| 2003/0062206 A1 | 4/2003 | Fujikawa | |
| 2010/0041503 A1 * | 2/2010 | Borntraeger | 475/5 |

FOREIGN PATENT DOCUMENTS

| | | |
|---|---|---|
| DE | 101 40 424 A1 | 2/2003 |
| DE | 101 52 471 A1 | 5/2003 |
| DE | 103 11 885 A1 | 10/2003 |
| DE | 102 25 249 A1 | 12/2003 |
| GB | 2 386 932 A | 10/2003 |

* cited by examiner

METHOD FOR CONTROLLING A MOTOR VEHICLE DRIVE TRAIN

This application is a national stage completion of PCT/EP2007/000314 filed Jan. 16, 2007, which claims priority from German Application Serial No. 10 2006 003 713.8 filed Jan. 26, 2006.

FIELD OF THE INVENTION

The invention concerns a method for controlling a motor vehicle drive train that comprises an internal combustion engine, an electric machine and a transmission, which are coupled together by a summation gear system with two input elements and one output element and by a bridging clutch made as a friction clutch. The first input element is connected in a rotationally fixed manner with the crankshaft of the combustion engine; the second input element likewise with the rotor of the electric machine, and the output element likewise with the input shaft of the transmission. The bridging clutch is arranged between two elements of the summation gear system so that when the bridging clutch is disengaged a speed difference existing, between the combustion engine and the input shaft of the transmission, is synchronized by the electric machine and, if necessary, also by controlled closing of the bridging clutch.

BACKGROUND OF THE INVENTION

A motor vehicle drive train of the type indicated above is known from DE 199 34 696 A1 and DE 101 52 471 A1. In these known drive trains, the summation gear system is, in each case, made as a simple planetary transmission with a sun gear, a planetary gear carrier with a plurality of planetary gears and a ring gear. The ring gear constitutes the first input element and is connected in a rotationally fixed manner to the crankshaft of the combustion engine. The sun gear is the second input element and is connected in a rotationally fixed manner to the rotor of the electric machine. The planetary carrier is the output element and is connected in a rotationally fixed manner to the input shaft of the shift transmission. The bridging clutch is, in each case, arranged between the sun gear and the planetary carrier of the planetary transmission.

According to DE 199 34 696 A1, in contrast to the structure described above, in the drive train the bridging clutch is formed as a claw-type clutch so that the bridging clutch can only be engaged when the combustion engine and the input shaft of the shift transmission are turning at the same speed with the consequence that its use is only limited. To enable the motor vehicle to be driven by the electric machine alone, a directional idler is arranged between the crankshaft and part of the housing, which prevents the crankshaft from backward rotation so that the drive torque of the electric machine is supported against the housing. To enable the combustion engine to be started by the electric machine when the motor vehicle is at rest, another directional idler is arranged between the input shaft of the shift transmission and part of the housing, which prevents the input shaft from backward rotation so that the drive torque of the electric machine is again supported against the housing.

According to DE 101 52 471 A1, as also proposed by the present invention, in the drive train, the bridging clutch is made as a friction clutch so that the bridging clutch can be used in slipping operation to transmit a torque even when there is a speed difference between the input shaft of the shift transmission and the combustion engine. To enable an impulse start of the combustion engine by the electric machine when the motor vehicle is at rest and the transmission is in neutral, a further friction clutch is arranged between the input shaft of the shift transmission and part of the housing whereby, once the electric machine has reached a starting speed, the input shaft can be braked in order to start the combustion engine.

Below, in the description of the invention the point of departure taken as an example without restricting the scope of protection will be a drive train of largely identical structure, such that the bridging clutch is assumed to be a friction clutch made in particular as a wet-operating disk clutch, but which can also be made as a dry clutch. Alternatively to the known arrangement, the bridging clutch can also be positioned between the ring gear and the sun gear, i.e., between the crankshaft of the combustion engine and the rotor of the electric machine.

During normal driving operation the bridging clutch is fully engaged so that the planetary transmission is locked and rotates solidly. In this operating condition, the speeds and rotation directions of the combustion engine, the electric machine and the input shaft of the shift transmission are all identical. In this condition, the electric machine operates mainly as a generator for supplying the on-board electrical system but, in certain operating situations particularly during acceleration phases of the motor vehicle, it can also operate as a motor for a time.

With a drive train of such type, in certain operating situations such as during starting and after a shift operation, when the bridging clutch is disengaged, a speed difference occurs in the summation gear system which then has to be equalized, i.e., synchronized, in order to enable the bridging clutch to be engaged again with as little slip and wear as possible. The synchronization of a speed difference Dn=n_GE−n_VM so caused between the input shaft of the shift transmission and the combustion engine and, therefore, also a speed difference Dn_K acting at the bridging clutch, usually takes place by way of the electric machine with the bridging clutch fully disengaged in that, if the speed difference is negative (Dn<0), the electric machine produces a positive torque M_EM>0 that acts in the rotational direction of the crankshaft of the combustion engine and the input shaft of the transmission while, if the speed difference is positive (Dn>0), it produces a negative torque M_EM<0 that acts in opposition to the rotational direction of the crankshaft of the combustion engine and the input shift of the transmission.

If the electric machine cannot bring to bear the torque necessary for this, for example by virtue of its design or because the battery of the on-board electrical system is discharged, the possibility exists of assisting synchronization by a controlled engagement of the bridging clutch. When this is done, however, there is a disadvantageous delay followed by a jerk, since the bridging clutch first has to be brought from the fully disengaged condition to the contact point before a torque can be transmitted and synchronization can proceed.

On the other hand, the bridging clutch should be kept fully disengaged for as long as possible in order to avoid a more prolonged slipping phase combined with an undesired drag torque and thermal problems.

Against this background, the purpose of the present invention is to indicate a method whereby, with a drive train of the type described earlier, the synchronization process can be improved. Such a method should also be able to be used in drive trains that comprise comparable components but in a different drive coupling combination.

SUMMARY OF THE INVENTION

Accordingly, the invention relates to a method for controlling a motor vehicle drive train that comprises an internal combustion engine, an electric machine and a transmission coupled to one another by a totalizing gear system with two input elements and one output element and by a bridging clutch made as a friction clutch. The first input element is connected in a rotationally fixed manner to the crankshaft of the combustion engine, the second input element likewise to the rotor of the electric machine and the output element likewise to the input shaft of the transmission. The bridging clutch is positioned between two elements of the summation gear system, such that when the bridging clutch is disengaged a speed difference that exists between the combustion engine and the input shaft of the transmission can be synchronized by way of the electric machine and, if necessary, also by a controlled engagement of the bridging clutch.

In this connection, it should be mentioned that the term "transmission" should be understood to mean any type of transmission which has a true neutral setting with a drive output speed of "zero", i.e., one which does not produce a drive output speed equal to "zero" by any kind of transmission-internal speed summation. Thus, the term "transmission" covers manual shift transmissions, automated transmissions, planetary automatic transmissions and continuously variable transmissions.

According to the invention, in the method just described, it is now provided that the bridging clutch is brought to its contact point at the beginning of the synchronization, before any assistance of the electric machine takes place by engaging the bridging clutch.

By virtue of the early contact of the friction elements of the bridging clutch, the clutch is brought to a state of readiness for operation and can be engaged without delay to assist the electric machine. This eliminates the otherwise inevitable time delay between starting and the contact point and the associated temporary torque interruption which would be perceived as an uncomfortable jerk in the drive.

During this, however, the drag torque caused by the contact of the bridging clutch and the evolution of heat due to the frictional slip can be disadvantageous. It is, therefore, best to test at the beginning of synchronization, whether the maximum torque $M\_EM\_max$ of the electric machine and the charge condition of an on-board electric system battery are sufficient for synchronization and to bring the bridging clutch to its contact point only when the result of the test is negative, i.e., when the available torque $M\_EM$ of the electric machine is not sufficient.

For this purpose, at the beginning of synchronization, the necessary torque M GE_soll on the input shaft of the transmission can be determined and the bridging clutch controlled, depending on the result, in the sense that a) the bridging clutch remains fully disengaged if the torque $M\_GE\_soll$ required is equal or engaged to zero or b) the bridging clutch remains fully disengaged if the torque $M\_GE\_soll$ required is more than zero but can be applied in full by the electric machine or c) the bridging clutch is brought to its contact point if the torque $M\_GE\_soil$ is more than zero, but cannot be applied in full by the electric machine.

BRIEF DESCRIPTION OF THE DRAWINGS

The invention will now be described, by way of example, with reference to the accompanying drawings in which.

DETAILED DESCRIPTION OF THE INVENTION

Figure 3:
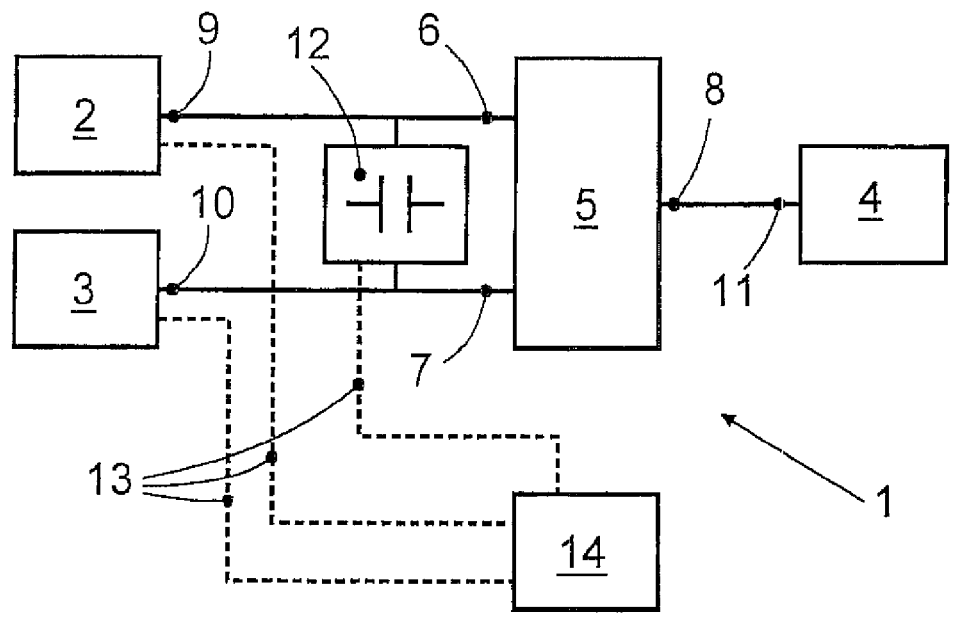
FIG. 3 is the general structure of a drive train, represented in a simplified, schematic manner.

A drive train 1 as in FIG. 3 comprises an internal combustion engine 2, an electric machine 3 and a transmission 4, which are coupled to one another by way of a summation gear system 5 having two input elements 6, 7 and one output element 8. The first input element 6 is in rotationally fixed connection with a crankshaft 9 of the combustion engine 2, the second input element 7 likewise with a rotor 10 of the electric machine 3, and the output element 8 likewise with an input shaft 11 of the transmission 4. A bridging clutch 12 made as a friction clutch is arranged between two elements of the totalizing gear system, in this case between the two input elements 6, 7. The combustion engine 2, the electric machine 3 and the bridging clutch 12 are connected via sensor and control lines 13 to a control unit 14 such that the components of the drive train 1 can be controlled in a coordinated manner.

Figure 4:
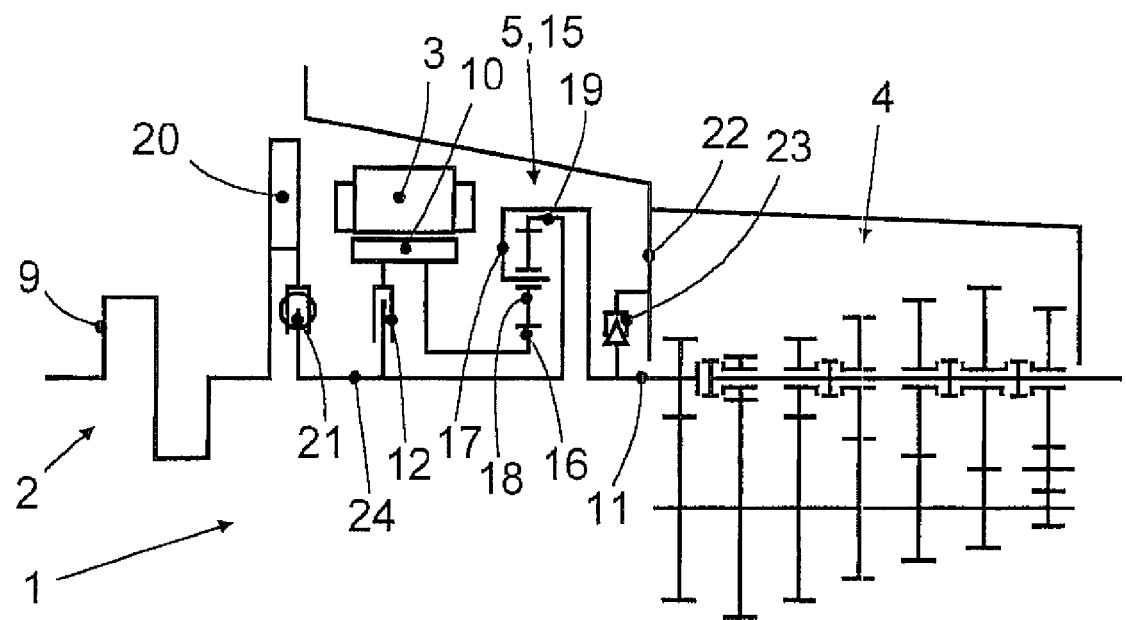
FIG. 4 is a preferred schematic, practical design of the drive train in FIG. 3.

A preferred practical design of the drive train 1 is illustrated in FIG. 4. In this drive train 1, the summation gear system 5 is made as a simple planetary transmission 15 with a sun gear 16, a planetary gear carrier 17 with a plurality of planetary gears 18 and a ring gear 19. The ring gear 19 constitutes the first input element 6 and is connected to the crankshaft 9 of the combustion engine 2 via a flywheel 20 and a rotation fluctuation damper 21. The sun gear 16 is the second input element 7 and is coupled directly with the rotor 10 of the electric machine 3. The planetary carrier 17 is the output element 8 and is connected directly to the input shaft 11 of the transmission 4 made as an automated shift transmission. A directional idler 23 arranged between the input shaft 11 and a part 22 of the housing serves to support the input shaft 11 when the combustion engine 2 is started by the electric machine 3. The shift transmission 4 is of countershaft structure and has a total of six forward gears and one reverse gear, which can be respectively and selectively engaged by way of a non-synchronized claw-type, shift clutch. The bridging clutch 12 is arranged between the rotor 10 of the electric machine 3 and a connecting shaft 24 such that the combustion engine 2 is connected to the ring gear 19.

With a drive train 1 of this type, a speed difference $Dn=n\_GE-n\_VM$ that occurs between the input shaft 11 of the transmission 4 and the combustion engine 2 when the bridging clutch 12 is disengaged during a starting process or a shift operation, has to be synchronized before the bridging clutch 12 can be completely engaged again.

Figure 2:
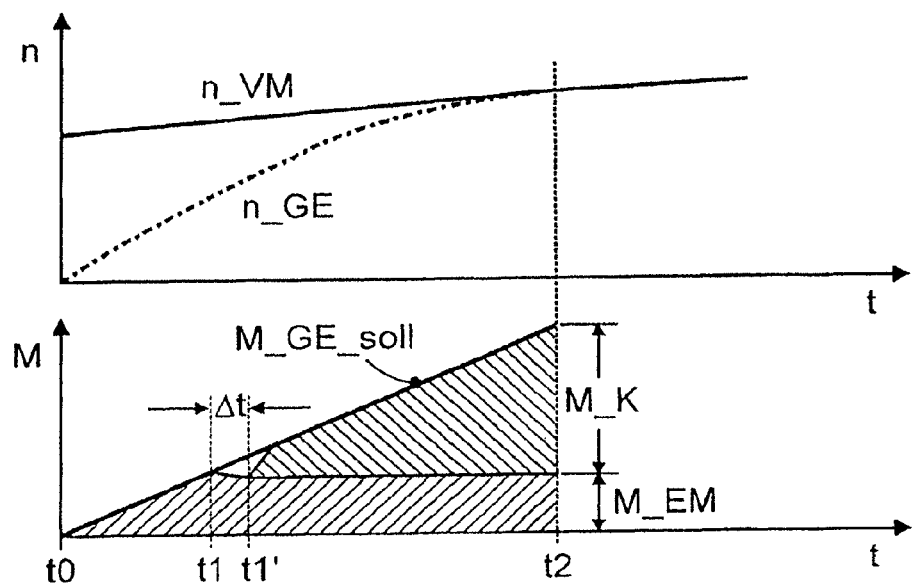
FIG. 2 is a known application example for the synchronization of a speed difference shown in the form of a combined speed and torque diagram.

Such a synchronization process is illustrated in FIG. 2 for a drive train 1 with a summation gear system 5 made as a planetary transmission 15 as in FIG. 4, in accordance with a conventional control sequence. The synchronization, during which a speed $n\_GE$ of the input shaft 11 of the shift transmission 4 is accelerated to a speed $n\_VM$ of the combustion engine 2, takes place at first only by way of the electric machine 3, i.e., by the action of the torque $M\_EM$ delivered by the electric machine 3. At time $t=t1$, the electric machine 3 has reached its maximum possible torque $M\_EM$, before the synchronous speed ($n\_GE=n\_VM$) has been reached.

To continue the synchronization, the bridging clutch 12 is therefore engaged in a controlled manner and by virtue of a torque $M\_K$ produced thereby the synchronous rotation ($n\_GE=n\_VM$) is achieved at time $t=t2$. However, since at time $t=t1$, the bridging clutch 12 is still fully disengaged and its frictional elements first have to be brought into contact before any torque M_K can be transmitted, a time delay Dt=t1'−t1 occurs before the bridging clutch 12 can respond, and this results in a transient speed break compared with the desired, steady nominal torque variation M_GE_soll.

Figure 1:
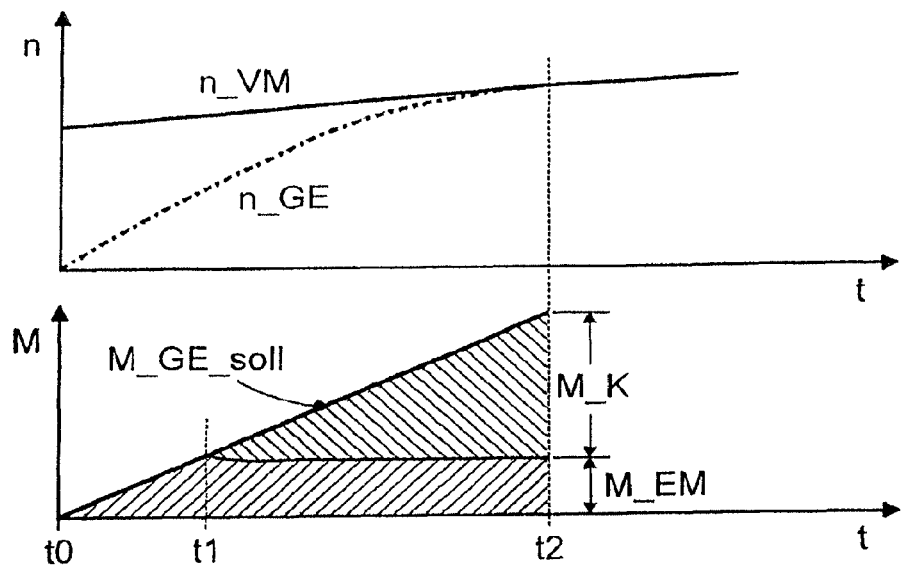
FIG. 1 is an application example, for the synchronization of a speed difference, shown in the form of a combined speed and torque diagram, according to the invention.

FIG. 1 shows the corresponding synchronization after a control sequence according to the invention. Again, synchronization at first takes place only by way of the electric machine 3, until it has reached its maximum possible torque M_EM at time t=t1. Now, however, the bridging clutch 12 has already been brought to its contact point since the beginning of the synchronization, whereby the clutch-internal free play has been eliminated and the pressure chamber has been prefilled. Thus, the torque M_K of the bridging clutch 12 is spontaneously available at time t=t1 so that a time delay Dt and the torque interruption, shown in the example of FIG. 2, are avoided.

For comparability of the torques M_GE, M_EM and M_K in the torque variations, depicted in FIGS. 1 and 2, the torque M_EM of the electric machine 3 and the torque M_K of the bridging clutch 12 therein are, in each case, reduced to the input shaft 11 of the shift transmission, i.e., multiplied by the respective transmission ratio i_EM/GE=(1−i$_0$) and i_K/GE=(1−i$_0$) that is effective in each case.

Independently of the example embodiments shown in FIGS. 3 and 4, the invention also includes the use of the method in drive trains with all other possible and different drive couplings between the combustion engine 2, the electric machine 3, the summation gear system 5, the clutch 12 and the transmission 4 which, however, are not illustrated separately here.

REFERENCE NUMERALS

1 drive train
2 internal combustion engine
3 electric machine
4 transmission, automated shift transmission
5 summation gear system
6 (first) input element
7 (second) input element
8 output element
9 crankshaft
10 rotor
11 input shaft
12 bridging clutch
13 sensor and control line
14 control unit
15 planetary transmission
16 sun gear
17 planetary carrier
18 planetary gears
19 ring gears
20 flywheel
21 rotation fluctuation damper
22 part of the housing
23 directional idler
24 connection shaft
i transmission ratio
i_EM/GE transmission ratio between 3 and 2
i_K/GE transmission ratio between 3 and 2
i$_0$ set ratio
M torque
M_EM torque of 3
M_EM_max maximum torque of 3
M_GE torque of 11
M_GE_soll required torque on 11
M_K torque of 12
n_GE speed of 11
n_VM speed of 2
t time
t0 time point
t1 time point
t1' time point
t2 time point
Dn speed difference between 11 and 2
Dn_K speed difference at 12
Dt time interval

The invention claimed is:

1. A method of controlling a motor vehicle drivetrain having an internal combustion engine (2), an electric machine (3) and a transmission (4) which are coupled with one another by a summation gear system (5, 15) with two input elements (6, 7) and one output element (8) and by a bridging clutch (12) made as a friction clutch, in which a first input element is connected, in a rotationally fixed manner, to a crankshaft (9) of the combustion engine (2), a second input element is connected, in a rotationally fixed manner, to a rotor (10) of the electric machine (3) and the output element (8) is connected, in a rotationally fixed manner, to an input shaft (11) of the transmission (4), and in which the bridging clutch (12) is arranged between two elements of the summation gear system (5, 15), and the method comprising the steps of:

synchronizing with the electric machine (3), when the bridging clutch (12) is disengaged, a speed difference existing between the combustion engine (2) and the input shaft (11) of the transmission (4) and, at a beginning of the synchronization, bringing the bridging clutch (12) to a contact point before the electric machine (3) is assisted by engagement of the bridging clutch (12) by a controlled engagement of the bridging clutch (12).

2. The method according to claim 1, further comprising the step of testing, at the beginning of synchronization, whether a maximum torque (M_EM_max) of the electric machine (3) and a charge condition of an on-board electric system battery are sufficient for the synchronization and, if a result of the test is negative, the bridging clutch (12) is brought to the contact point.

3. The method according to claim 2, further comprising the step of determining, at the beginning of the synchronization, a required torque (M_GE_soll) on the input shaft (11) of the transmission (4) and, depending on the result, accordingly controlling the bridging clutch (12) such that:

if the required torque (M_GE_soll) is one of equal and close to zero, leaving the bridging clutch (12) fully disengaged;

if the required torque (M_GE_soll) is more than zero and can be applied in full by the electric machine (3), leaving the bridging clutch (12) fully disengaged, and if the required torque (M_GE_soll) is more than zero but cannot be applied in full by the electric machine (3), bringing the bridging clutch (12) to the contact point.

4. A method of controlling a motor vehicle drive train (1) during synchronization of an internal combustion engine (2) and a transmission (4) of the drive train (1), which further includes an electric machine (3), a clutch (12) and a summation gear system (5, 15) having a first input element (6), a second input element (7) and an output element (8), the first input element (6) is rotationally fixed to a crankshaft (9) of the combustion engine (2), the second input element (7) is rotationally fixed to a rotor (10) of electric machine (3), and the output element (8) is rotationally fixed to an input shaft (11) of the transmission (4), the method comprising the steps of:
- accelerating rotation of the input shaft (11) of the transmission (4) with the electric machine (3) to reduce a difference between a rotational speed of the input shaft (11) of the transmission (4) and a rotational speed of the crankshaft (9) of the combustion engine (2);
- simultaneously preparing the clutch (12) for engagement while accelerating rotation of the input shaft (1); and
- further accelerating rotation of the input shaft (11) of the transmission (4) by engaging the clutch (12).

5. The method according to claim 4, further comprising the step of testing, at the beginning of synchronization, whether a maximum torque (M_EM_max) of the electric machine (3) and a charge condition of an on-board electric system battery are sufficient for the synchronization and, if a result of the test is negative, preparing the clutch (12) for engagement.

6. The method according to claim 5, further comprising the step of determining, at the beginning of synchronization, a required torque (M_GE_soll) on the input shaft (11) of the transmission (4);
- leaving the clutch (12) fully disengaged if the determined required torque (M_GE_soll) is substantially zero;
- leaving the clutch (12) fully disengaged if the determined required torque (M_GE_soll) is more than zero and is applicable in full by the electric machine (3); and
- preparing the clutch (12) by bringing the bridging clutch (12) to the contact point if the required torque (M_GE_soll) is more than zero and the electric machine (3) is incapable of supplying the determined required torque (M_GE_soll) in full.

* * * * *